(No Model.) 2 Sheets—Sheet 2.
W. S. ANDREWS.
ELECTRIC LIGHTING SYSTEM AND SWITCH.
No. 317,610. Patented May 12, 1885.
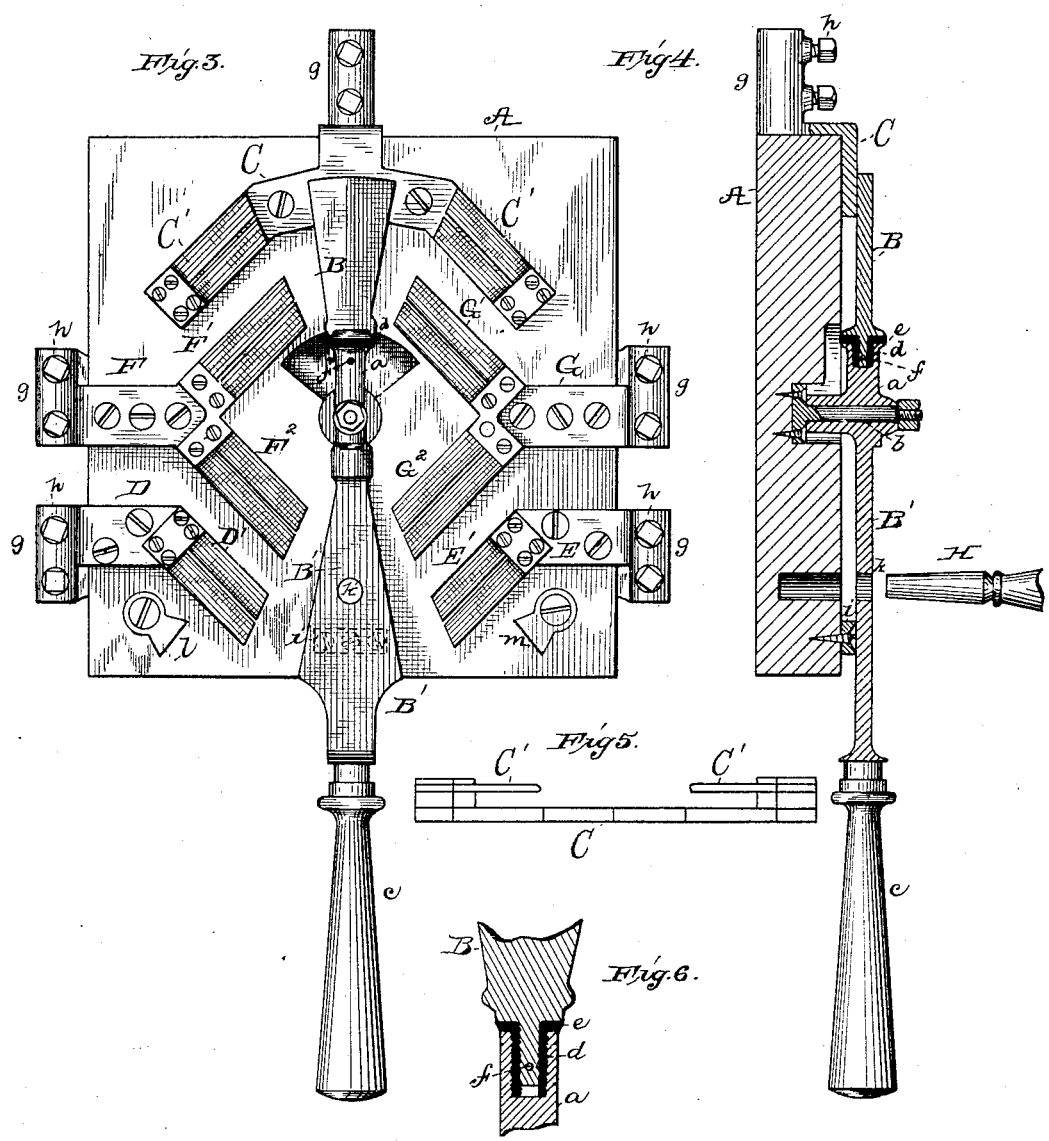
ATTEST:
E. C. Rowland
Paul D. Dyer
INVENTOR:
William S. Andrews
By Rich'd N. Dyer
Atty.

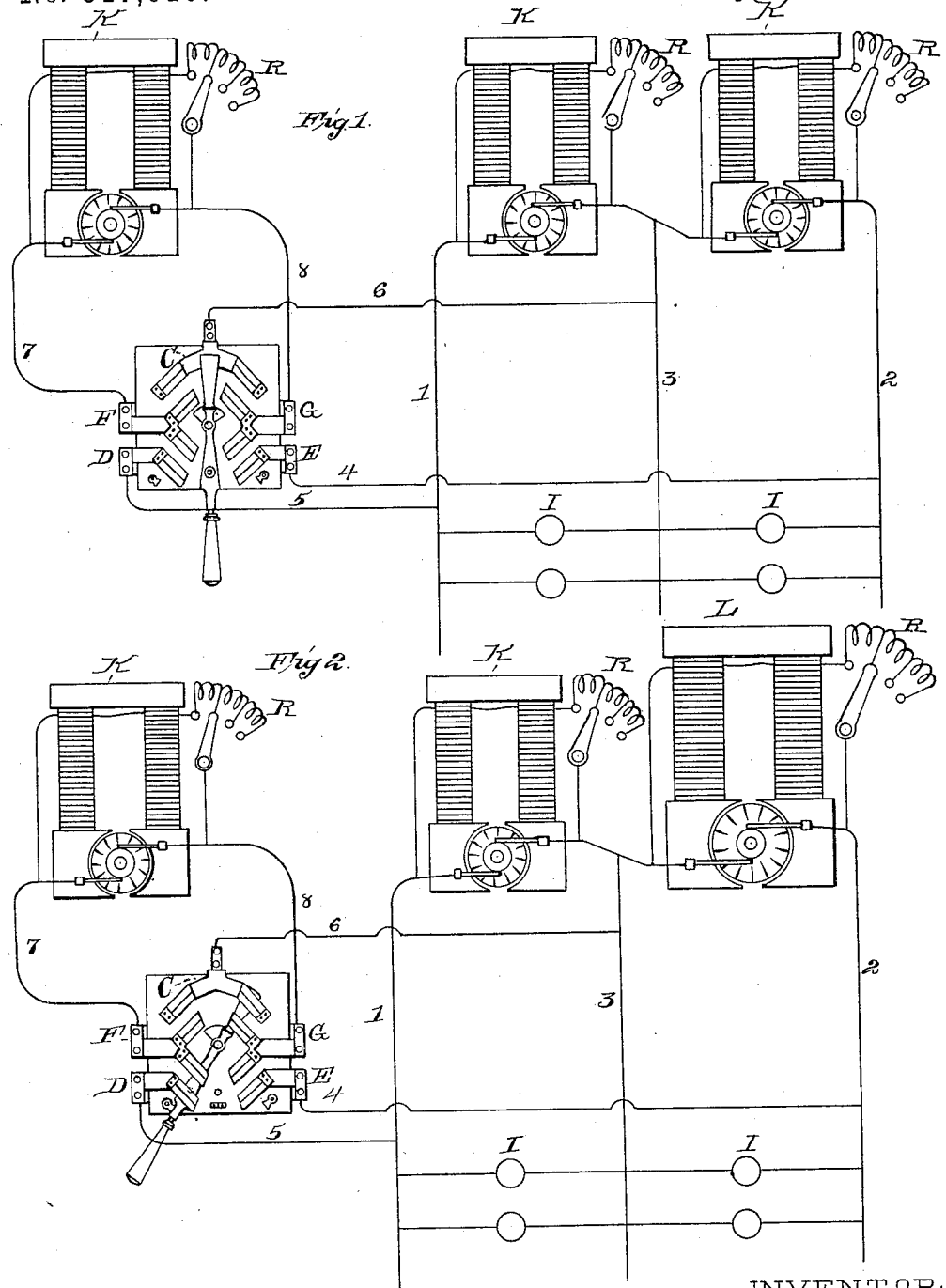

UNITED STATES PATENT OFFICE.

WILLIAM S. ANDREWS, OF NEW YORK, N. Y., ASSIGNOR TO THE EDISON ELECTRIC LIGHT COMPANY, OF SAME PLACE.

ELECTRIC LIGHTING SYSTEM AND SWITCH.

SPECIFICATION forming part of Letters Patent No. 317,610, dated May 12, 1885.

Application filed August 18, 1884. (No model.)

*To all whom it may concern:*

Be it known that I, WILLIAM S. ANDREWS, of New York city, in the county and State of New York, have invented a certain new and useful Improvement in Systems of Electric Lighting and in Switches Therefor, of which the following is a specification.

My invention relates to the Edison three-wire or compensating system of electrical distribution. Such systems are provided with one or more spare or reserve machines, which it is found desirable to connect sometimes with one and sometimes with the other side of the circuit; or in disconnecting a machine from the system it is often desirable to throw over to that side of the system one of the working-machines. This latter necessity may arise, for example, when a system is supplied with three machines—a 400-light machine on one side of the circuit and two 200-light machines on the other side. During the time when the consumption of current is small the 400-light machine may be disconnected from the system and one of the 200-light machines be thrown onto that side of the circuit. It is necessary that the polarity of the field-magnet of a machine should not be reversed in shifting the machine from one side of the circuit to the other.

The object I have in view is to produce means for accomplishing the end sought in a simple and effective manner.

The invention is embodied in the apparatus shown in the accompanying drawings, in which—

Figures 1 and 2 are views, principally in diagram, of a three-wire system of electric lighting with machines arranged for throwing from one side of the circuit to the other; Fig. 3, an elevation of a switch for effecting the change of connections; Fig. 4, a vertical section of this switch; Fig. 5, an edge view of the neutral or central contact-plate; and Fig. 6 a section, on a larger scale, through the switch-lever at its insulating-section.

Referring especially to Figs. 3, 4, 5, and 6, A is the base-board of the switch, made of wood or other suitable insulating material, and upon this base-board is mounted the centrally-pivoted switch-lever. This lever is composed of two double metallic contact-blades, B B', joined to a central section, $a$, through which the pivoting-bolt $b$ passes, the contact-blade B' terminating in an operating-handle, $c$. The contact-blades are insulated from each other by a thimble, $d$, of hard rubber or other suitable material. This thimble is screw-threaded externally and internally, Fig. 6. It turns into a screw-threaded socket in one end of central section, $a$, of the lever and receives the screw-threaded inner end of the contact-blade B. The thimble has a flange, $e$, which prevents contact of the abutting end and shoulder of the metallic parts. A pin, $f$, of vulcanized fiber or other suitable insulation, is driven through a hole drilled through the parts after they are screwed together.

The base-board has mounted upon it a contact-plate for the neutral or compensating conductor of the system, contact-plates for the positive and negative conductors of the system, and contact-plates for the positive and negative terminals of the machine.

The contact-plates terminate in separate binding-sockets $g$, provided with holding-screws $h$, for receiving and securing the several conductors leading to the contact-plates.

The neutral or compensating contact-plate C is secured centrally upon the upper part of the base-board, beneath the outer and upper end of contact-blade B, which rests constantly thereon. At its ends this plate C has contact-springs C', raised upon metal blocks and projecting inwardly, parallel with plate C, making contact with the upper side of blade B when thrown in either direction and forcing the blade down upon plate C.

The contact-plates D and E for the positive and negative conductors of the system are located on opposite sides of the base-board, at the lower end of the same. These plates make contact with blade B' when the switch-lever is thrown to one side or the other, both being out of contact with said blade when the switch-lever is in a central position. Plates D and E have inwardly-projecting contact-springs D' E', raised on blocks and making contact with the upper side of the contact-blade and forcing it down upon the plates D E, so as to insure good contact.

Opposite the center of the switch-lever, on opposite sides of the base-board, are the positive and negative dynamo contact-plates F G. These plates have V-shaped inner ends, each plate having two arms, F' F² and G' G², projecting one above and one below the pivot of the switch-lever. Arms F' G' make contact with blade B, while F² and G² make contact with blade B'. These plates have spring contact-plates, the same as the other plates, and they are arranged so that when the switch-lever is in a central position the contact-blades will not be in contact with such plates. In the central position of the switch-lever the blade B' is supported by a plate, $i$, having no circuit-connection, but when the lever is swung to either side blade B' leaves this plate and is received by the double contacts.

The lever may be locked in a central position by a hand-plug, H, which passes through a hole, $k$, in blade B' into the base-board.

It will be noticed that the contact-plates are arranged obliquely upon the base-board, so that the contact-blades will be at right angles to the contact-plates they engage when thrown in either direction to the limit of their movement. The contact-blades are also made of dovetail shape, being smaller at their inner ends, so as to strike and leave the contact-plates on each side simultaneously.

Stops $l$ $m$ are secured to the base-board to limit the movement of the switch-lever.

Referring more especially to Figs. 1 and 2, the conductors 1 and 2 are the positive and negative conductors, and 3 is the neutral or compensating conductor, of an Edison three-wire or compensating system of electric lighting. I represents incandescing electric lamps. K L represent dynamo-electric machines, the machines K having a smaller capacity than L—K being, for example, 200-light machines and L a 400-light machine. Each machine is self-contained, having its field-magnet coils in a circuit derived from its own armature, and in each field-circuit is an adjustable resistance, R, for purposes of regulation. In each of the figures one of the described switches is shown, enabling one machine to be connected with either side of the system. Two or more machines, or all machines, of the system may have like switches, if desired. Conductors 4 and 5 run from the positive and negative system conductors 1 and 2 to contact-plates D E of the switch. Conductor 6 runs from the neutral or compensating system conductor 3 to plate C, and conductors 7 8 run from the positive and negative machine terminals to plates F G.

In Fig. 1 the machine at the left-hand side of the figure is a spare machine. It is shown as not connected with the system at all, the switch-lever being in a central position. If either of the other machines should break down or be stopped for repairs or for any other reason, this spare machine would be thrown into circuit to take its place; or if one of the working-machines should become overloaded the spare machine may be thrown into circuit on the same side of the system to assist the overloaded machine. By throwing the handle of the switch-lever to the left the spare machine will be connected with the left-hand division of the system. By throwing such handle to the right said machine will be connected with the right-hand division of the system, the same polarity of the field-magnet of the machine being maintained.

In Fig. 2 no spare machine is shown, but the three machines supply the system, the two small machines K on one side and the large machine L on the other. The machine at the left-hand side of the figure is connected to the system conductors through one of the switches described. The machine is shown as connected with the left-hand division of the system, assisting the other machine, K. When the consumption decreases so that the large machine L can be disconnected from the system, the machine K at the left of the figure is thrown over onto the right-hand division of the system to take the place of machine L, and the system will then be supplied by the two small machines K. The switch can be operated without stopping the machine.

It may be found desirable to change the arrangement of the machines supplying a system such as described, or to throw in additional machines upon one side or the other of the system, for reasons and under conditions other than those set forth. I have given the usual circumstances under which the invention will be found useful; but my invention extends to the switching of dynamo-machines from one side of a three-wire or compensating system to the other without changing the polarity of the field-magnet, regardless of the particular purpose for which this may be done.

What I claim is—

1. The combination, with a three-wire or compensating system of electrical distribution, of a dynamo-electric machine, and a switch and connections between said machine and switch and between the switch and the three conductors of the system for connecting such machine with either side of the system, substantially as set forth.

2. The combination, with a three-wire or compensating system of electrical distribution, of a dynamo-electric machine having its field-magnet in a circuit derived from its armature, and a switch and connections between said machine and switch and between the switch and the three conductors of the system for connecting such machine with one side of the system or the other without changing the polarity of its field-magnet, substantially as set forth.

3. In an electrical switch, the combination, with a centrally-pivoted lever carrying two contact-blades located on opposite sides of the pivot and insulated from each other, of two sets of contact-plates on each side of the lever, which plates are bridged by the contact-blades, substantially as set forth.

4. In an electrical switch, the combination, with a pivoted switch-lever carrying insulated contact-blades on opposite sides of its pivot, of two double or V shape contact-plates located on opposite sides of the lever-pivot and single contact-plates above and below such double or V shape contact-plates, which single and double plates are bridged by the contact-blades, substantially as set forth.

5. In an electrical switch, the combination, with a pivoted switch-lever carrying insulated contact-blades on opposite sides of its pivot, of a contact-plate with which one of said blades is constantly in contact, two contact-plates on opposite sides of the same blade, with one or the other of which the blade makes contact when the lever is thrown in either direction, and two sets of contact-plates on opposite sides of the other contact-blade, said plates being bridged by this latter blade, substantially as set forth.

6. In an electrical switch, the combination, with a pivoted switch-lever having insulated blades B B', of the contact-plates C D E F G, constructed and arranged substantially as set forth.

This specification signed and witnessed this 12th day of August, 1884.

WILLIAM S. ANDREWS.

Witnesses:
A. W. KIDDLE,
J. F. KIRBY.